Jan. 4, 1955 L. R. BOURGONJON 2,698,876
TRANSMITTING DEVICE FOR FREQUENCY-SHIFT TELEGRAPHY
Filed May 7, 1953
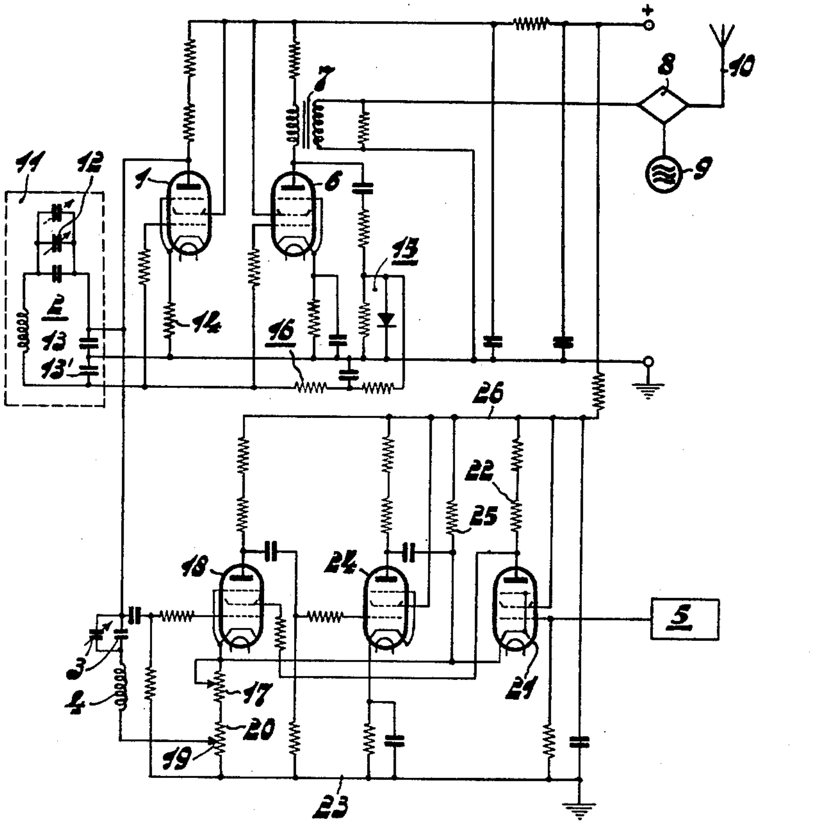
INVENTOR
LOUIS RAYMOND. BOURGONJON
BY Fred M. Vogel
AGENT

1

2,698,876

TRANSMITTING DEVICE FOR FREQUENCY-SHIFT TELEGRAPHY

Louis Raymond Bourgonjon, Hilversum, Netherlands, assignor to Hartford National Bank and Trust Company, Hartford, Conn., as trustee Application May 7, 1953, Serial No. 353,458

Claims priority, application Netherlands May 17, 1952

5 Claims. (Cl. 178—66)

This invention relates to transmitting devices for frequency-shift telegraphy, for example for the transmission of Morse signals, telex signals and the like. In such transmitting devices the telegraphy signals characterised by frequency-shifts are obtained by varying the tuning frequency of an oscillator circuit in the rhythm of the telegraphy-signals with the use of a key impedance which is connected to the frequency-determining circuit of the oscillator circuit.

The object of the invention is to provide a particularly advantageous transmitting device of the said kind, which may successfully be used for very high signalling speeds, for example, of some thousands of Baud.

According to the invention, the key impedance which is connected to the frequency-determining circuit of the oscillator circuit is included between the control-grid and the cathode circuit of an amplifying tube which is negatively back-coupled by a cathode resistor and which, in order to obtain frequency-shift, is keyed in the rhythm of the signals by means of a signal source.

In order to increase the negative feedback of the keyed amplifying tube, the variations in the anode voltage of this tube are supplied to a control grid of an auxiliary amplifying tube, the anode of which is connected to the cathode of the keyed tube.

The important advantage thus ensues that the frequency-shift of the telegraphy signals being emitted is substantially not influenced by aging and the like of the backcoupled amplifying tube.

The invention and its advantages will now be explained more fully with reference to the telegraphy transmitting device according to the invention which is shown, by way of example, in the accompanyin drawing.

The figure shows a transmitting device for frequency-shift telegraphy, comprising an oscillator circuit having a pentode 1, of which the tuning frequency is varied in the rhythm of signals originating from a signal source 5 by means of a key impedance which is connected to the oscillator circuit 2 and which is constituted by the series-combination of a capacitor 3 and an inductor 4.

The telegraphy signals occurring at the oscillator circuit 2 and characterised by frequency-shifts are supplied, after being amplified in a voltage amplifier 6, by way of an output transformer 7 to a modulator 8, which is connected to a carrier-wave oscillator 9, stabilized by a quartz crystal, the telegraphy signals subsequently being emitted via a transmitting aerial 10.

In the oscillator circuit as shown, the frequency-determining oscillator circuit comprising an adjustable capacitor 12 is arranged in a thermostat 11. The frequency of the local oscillations may be adjusted, for example, between 300 and 350 kc./s. The feedback voltage for the oscillator circuit is derived from a capacitive voltage divider 13, 13′, which is connected in series with the adjustable capacitor 12 and which is included between the control-grid and the anode circuit of the oscillator tube 1 and of which the earthed tapping point is connected by way of a resistor 14 to the cathode of tube 1. In this oscillator circuit the negative grid-bias of the oscillator tube 1 is obtained by means of a rectifying circuit 15, which is connected to the output circuit of the amplifying stage 6 and which, for this purpose, is connected by way of a smoothing filter 16 to the control-grid of the oscillator tube 1. The oscillator frequency is thus no longer influenced by grid current. The stability of frequency in this circuit is, for example $1:10^4$.

According to the invention, the telegraphy signals char-

2 acterised by frequency-shifts are obtained by connecting the key impedance 3, 4 between the control-grid and the cathode circuit of an amplifying tube 18, which is negatively backcoupled by a cathode resistor 17 and which is keyed in the rhythm of the signals by means of signal source 5. The junction between the impedance 3, 4 and the cathode circuit of the negatively backcoupled amplifying tube is constituted by the adjustable tapping point 19 on a voltage divider 20, which is included in the cathode circuit.

A signalling tube 21, which is controlled by signal source 5, is used for keying the amplifying tube 18, the signalling tube 21 having cathode resistor 17 in common with the amplifying tube 18, whilst the anode circuit 22 of signalling tube 21 is connected to the screen grid of amplifying pentode 18. The signalling tube 21 conveys anode current during a signalling interval, the cathode potential of amplifying tube 18 is thus high and the screen-grid potential is low, which causes amplifying tube 18 to be cut off. Whenever a pulse of negative polarity occurs at the control-grid of the signalling tube, the signalling tube 21 is cut off, the screen-grid potential of tube 18 increases and the cathode potential decreases, so that tube 18 is released, which then fulfills the function of an amplifier.

In the released position of amplifying tube 18, the alternating cathod voltage of this tube is substantially equal to the control-grid voltage, so that in the upper position of the adjustable tapping point 19 on the voltage divider difference in potential substantially does not occur across the key impedance 3, 4. This implies that the impedance of the network 3, 4 as viewed from the oscillatory circuit 2, has a very high value, i. e. that the frequency of the oscillations generated by the oscillator is substantially not influenced by the key impedance 3, 4. The frequency of the oscillations generated by the oscillator is in this case determined almost exclusively by the oscillator circuit 2.

In the cut-off position of amplifying tube 18, however, the frequency of the local oscillations is determined by the tuning frequency of the circuit 2 comprising the key impedance 3, 4 connected parallel to capacitor 13 of the voltage divider. Consequently, the magnitude of the frequency-shift is substantially determined by the variation in the tuning frequency of circuit 2, if the network 3, 4 is connected in parallel with capacitor 13 of the voltage divider. For example, in the embodiment under consideration the frequency shift has been chosen to be approximately 1000 c./s.

When the adjustable tapping point 19 on the voltage divider 20 is displaced in the direction of the earth wire 23, the magnitude of the frequency shifts decreases to zero, that is to say the tube 18 no longer acts upon the frequency of the oscillations generated by the oscillator 1, if the tapping point 19 is connected to the earth wire 23. It has been found in practice that the magnitude of the frequency shifts linearly varies within some percent with the displacement of the adjustable tapping point 19 on the voltage divider. Consequently, the desired frequency shift may be adjusted in a particularly simple manner with the use of a linear scale betwen 0 and 1000 c./s.

In order to ensure that the adjusted frequency-shift is substantially independent of the properties of the amplifying tube 18, the variations in the anode voltage of this tube are supplied to a control-grid of an auxiliary amplifying tube 24, the anode of which is connected to the cathode of the keyed tube. The material increases in the negative feedback factor furthermore permit the use of a cathode resistor 17, which has a low value relatively to the impedance 3, 4, so that the variations in damping introduced into the oscillator circuit 2 by cathode resistor 17 are minimized. This implies that the variations in amplitude and frequency brought about by the damping variations in the oscillations generated by the oscillator circuit 1 are particularly small. For example, it has been measured in practice that the amplitude variations with a cathode resistor of about 100 ohms are not more than some percent, whilst the frequency variations are negligible. In order to obtain the required negative grid-bias for tube 18 with this small cathode resistor, the cathode of tube 18 is connected by way of a resistor 25 to the anode-voltage lead 26.

It may be mentioned here that, as an alternative, other oscillator circuits may be used for generating the telegraphy signals characterized by frequency shift, for example, a Hartley-oscillator, an RC-oscillator or the like. The key impedance may in this case be constitued by a capacitor, an inductor or a network constituted by reactances. With an RC-oscillator the use of a pure resistor is even possible.

The use of the key impedance 3, 4, which is constituted by the series-combination of a capacitor 3 and an inductor 4, in combination with the tunable oscillator circuit 2 affords particular advantages, as will now be explained more fully. If the resonance frequency of the key impedance 3, 4 is chosen to be approximately $f_0\sqrt{3}$, $f_0$ being the central frequency of the tuning range of the oscillator circuit, it appears that the frequency-shift introduced by the said impedance is constant within wide limits of the range of tuning. In the example shown, in which the oscillator is tunable between 300 and 350 kc./s., the resonance frequency of the network 3, 4 is about $325\sqrt{3}=563$ kc./s., the frequency-shift introduced remaining constant within 1% throughout the tuning range of the oscillator. Consequently, as a result of this step the magnitude of the frequency-shift may be adjusted wholly independently of the oscillator frequency.

It will be evident after the foregoing that other networks may be used as well for this purpose.

I claim:

1. A transmitting device for the transmission of frequency-shift telegraphy signals comprising a wave oscillator having a frequency-determining circuit including a key impedance for varying the tuned frequency of said oscillator circuit in the rhythm of the telegraphy signals, an amplifying stage including an electron discharge device having an anode, a cathode and a control-grid, and a cathode circuit including a resistor, said amplifying stage being negatively back-coupled by said cathode resistor, said key impedance being connected between said control-grid and said cathode circuit, and a signal source coupled to said amplifying stage for keying said stage in the rhythm of said telegraphy signals.

2. A transmitting device, as set forth in claim 1, further including an auxiliary amplifying tube having a control-grid and an anode, the anode of said first device being coupled to the control-grid of said tube and the anode of said tube being coupled to the cathode of said first device whereby the negative feedback of said keyed amplifying device is increased.

3. A transmitting device, as set forth in claim 1, wherein said cathode circuit further includes a voltage divider having an adjustable tapping point, said point constituting the junction between said key impedance and said cathode circuit.

4. A transmitting device, as set forth in claim 1, wherein the value of said key impedance for the predetermined frequency of oscillations generated by said oscillator is higher than that of the cathode resistor of said back-coupled amplifying stage.

5. A transmitter device for the transmission of frequency-shift telegraphy signals comprising an oscillator circuit having a tunable frequency-determining circuit including a fixed capacitor and a key impedance shunting said fixed capacitor and constituted by the series-combination of a second capacitor and an inductor, the resonance frequency of said key impedance having a value equal to $\sqrt{3}$ times that of the central frequency of the tuning range of said oscillator circuit, an amplifying stage including an electron discharge device having an anode, a cathode and a control-grid and a cathode circuit including a voltage divider having an adjustable tapping point and a series-connected resistor having a value less than that of said key impedance for the predetermined frequency of oscillations generated by said oscillator, said amplifying stage being negatively back-coupled by said resistor, said key impedance being connected between said control-grid and said cathode circuit, the adjustable tapping point of said voltage divider constituting the junction between said key impedance and said cathode circuit, an auxiliary amplifying tube having a control-grid and an anode, the anode of said first device being coupled to the control-grid of said tube and the anode of said tube being coupled to the cathode of said first device whereby the negative feedback of said amplifying device is increased, and a signal source coupled to said amplifying stage for keying said stage in the rhythm of said signals.

References Cited in the file of this patent

UNITED STATES PATENTS

| | | |
|---|---|---|
| 2,398,054 | Sprague | Apr. 9, 1946 |
| 2,492,791 | Finch | Dec. 27, 1949 |

FOREIGN PATENTS

| | | |
|---|---|---|
| 211,573 | Switzerland | Dec. 16, 1940 |